United States Patent Office 3,834,921
Patented Sept. 10, 1974

3,834,921
LOW SURFACE AREA PIGMENTS
Robert Kenneth Mays, Havre De Grace, and Lowell Edwin Hackbarth, Bel Air, Md., assignors to J. M. Huber Corporation, Locust, N.J.
No Drawing. Filed Oct. 7, 1971, Ser. No. 187,580
Int. Cl. C09c 1/28; C08h 17/04
U.S. Cl. 106—288 B                          1 Claim

ABSTRACT OF THE DISCLOSURE

An improved functional filler and extender pigment in alkyl ketene dimer sized alkaline paper, method of manufacturing said pigment, and method of addition.

BACKGROUND OF THE INVENTION

This invention consists essentially of finely divided synthetic silica pigments and their addition to certain types of alkaline paper, paper coatings, rubber, paints and other similar materials. These silica pigments are of an improved composition having low surface area, large particle size, and low oil absorption, all of which make the pigments especially valuable as fillers and extenders in an alkyl ketene dimer sized paper such as "Aquapel" sized paper. Aquapel is a typical alkyl ketene dimer manufactured by Hercules, Incorporated.

Previously, when finely divided filler/extender pigments were added to alkaline sized paper, a rather sharp decrease in sizing (resistance to the penetration of water and/or ink) occurred and the optical efficiency of the pigments was difficult to maintain. This loss of optical efficiency added significantly to the cost of alkaline sized paper since more high cost pigment was required to obtain opacity equal to that of a similar rosin sized paper. This sensitivity of alkaline sized paper to certain types of fillers has been a major hindrance in manufacturing alkaline sized paper economically. It is desirable in the manufacture of such paper to retain the filler and extender pigments at as high a level as possible to minimize the ratio of filler to alkyl ketene dimer at the head box. At the same time it is advantageous to retain additional alkyl ketene dimer in the sheet since this improves the sizing of the paper. Filler/extender pigments existing in the prior art, such as regular sodium alumino silicates, aluminum silicates, aluminum hydrates, and calcium silicates lacked these desirable properties.

SUMMARY OF THE INVENTION

Sizing efficiency appears to be related to the surface area of pigments used in alkaline sized paper. Use of a pigment with low surface area generally produces paper with better sizing than those with higher surface areas (over 40 m.²/g.). Both sizing and optical efficiency improve as pigment retention increases and improvement in sizing also results from increased sizing agent retention.

A number of modified sodium alumino silicate pigments were developed and added to alkaline sized paper to overcome the difficulties experienced in the prior art. Pigments with low surface area (15–40 m.²/g.) such as the new sodium alumino silicates gave much better sizing than other available pigments such as aluminum silicates, aluminum hydrates, and calcium silicates.

Accordingly it is an object of this invention to provide a new and valuable sodium alumino silicate pigment which is a highly effective functional filler and extender pigment in alkaline sized paper and which overcomes the deficiencies of the prior art described above.

Another object of this invention is to provide a means of reacting alkali metal silicates and water soluble aluminum salts to produce a new and valuable precipitated sodium alumino silicate characterized by a low surface area and high density.

It is a further object of this invention to produce alkaline sized paper with increased sizing and opacity and decreased production costs and to provide a process of manufacturing alkaline sized paper utilizing an alkyl ketene dimer as the sizing agent in combination with major paper filler and extender pigments without sacrificing the quality of sizing and opacity or increasing the production costs of the paper.

It is a further object of this invention to provide alkaline sized paper with increased sizing and opacity and decreased production costs.

Another object of this invention is to provide ways of reacting alkali metal silicates and water soluble aluminum salts as to produce a new, valuable precipitated sodium alumino silicate characterized by a low surface area in the range of 15 to 40 m.²/g., large particle size where the mean particle diameter is about 70 millimicrons, a specific gravity of 2.37 g./cc., and low oil absorption of 65 cc. oil/100 grams of pigment.

Yet another object is to provide a method to effectively utilize an alkyl ketene dimer, an alkaline sizing agent, in the presence of and in combination with major paper filler and extender pigments, consisting mainly of those materials described above.

Other objects and a fuller understanding of the invention may be had by referring to the following description and claims taken in conjunction with each other.

The present invention overcomes the deficiencies of the prior art and achieves its objectives by providing for the addition of effective filler and extender pigments in alkaline sized paper, thereby insuring improvements in both sizing and optical efficiency of the paper thus reducing the cost of alkaline sized paper since less high cost pigment is required.

DESCRIPTION OF THE PREFERRED EMBODIMENTS

To provide and facilitate a better understanding of the present invention, reference will be made to certain embodiments of the present invention. These embodiments are not to be construed as limiting the scope or breadth of the present invention, but are exemplary only.

It might be particularly advantageous to very briefly review the history of sized paper. Nearly all of the so-called fine papers, such as stationery, office, and printing paper, are made resistant to the penetration of water and ink. This property, known as sizing, is necessary for papers which are used with aqueous ink and important for papers which are to be printed by offset lithography or coated with a water based coating. Sometimes it may merely minimize the adsorption of water which may accidentally contact the paper. Orginally, paper sheets were sized by being dipped in thin solutions of animal glue. In 1807, it was learned that rosin could be added to the paper stock as an alkaline solution and, then, precipitated onto the fibers with alum. This technique has sized paper efficiently and inexpensively since that time with little variation.

Rosin sized papers suffer a gradual deterioration of strength properties with aging. This loss of strength is a serious problem for books, documents, manuscripts, and other paper that must be stored or used over long periods of time. In contrast, alkaline sized paper exhibits excellent aging characteristics and, regardless of the fact that there are few alkaline sizing agents available, it is predicted that at least 20% of all sized papers will eventually be alkaline sized.

Alkaline sizing is becoming of increasing importance to papermakers. Not only does it produce paper of unusually long life, but it also permits the use of calcium carbonate fillers and coated broke containing calcium carbonate. There are several differences between alkaline sized paper and similar paper sized with rosin. These include the existence of a threshold level of alkyl ketene dimer below which sizing efficiency declines very rapidly. Also, alkaline sized papers are usually stronger than those sized with rosin but sheet opacity is normally lower. It was found that some fine particle sized extenders, such as those sodium alumino silicates which are defined in U.S. Pat. No. 2,739,073, and which are excellent titanium dioxide extenders in rosin sized paper, interfere with alkyl ketene dimer sizings. An alkyl ketene dimer, reacts under basic conditions as a weak acid. It reacts, for example, with active hydroxyl groups and with the active hydrogen of piperidine. Piperidine is a cyclic compound, strong base, and colorless liquid which is soluble in water.

As noted, a number of extender pigments were evaluated in alkaline sized paper. Most notable were aluminum hydrates, calcium silicates and sodium alumino silicates. It was discovered that aluminum hydrates functioned satisfactorily as did the ordinary sodium alumino silicates and calcium silicates at higher levels of retention. However, a low surface area sodium alumino silicate gave much better sizing than the above mentioned materials.

Thus, it has been found that a sodium alumino silicate with a surface area in the range of 15 to 40 m.$^2$/g. performs satisfactorily as a filler and extender pigment in alkaline sized paper and has other uses as well.

Sizing is definitely related to the surface area, surface reactivity, and Zeta potential of pigments used in alkaline size paper. This sodium slumino silicate pigment is characterized by a relatively large particle size with a mean particle diameter of about 70 millimicrons; a high specific gravity equivalent to about 2.37 g./cc.; a pack density of 31 to 37 lbs./cu. ft.; a pour density of 22 lbs./cu. ft.; and oil absorption of 65 cc. oil/100 g. sodium alumino silicate, to list but a few of the unique properties.

The sodium alumino silicate pigment of the present invention when compared with other pigments of comparable surface area does not appear to be as reactive and therefore does not detrimentarily exhaust the available reactive sites. The pigment of the present invention appears to be a filler which acts as a carrier for the sizing agent, leaving the occupation of reactive sites to be determined by its unique surface activity.

The solutions that go to make up this novel synthetic silica pigment are combined in such a manner that the reaction medium is maintained at an alkaline or near alkaline pH throughout the reaction and particularly at the end. A white, high brightness friable powder is obtained in this manner with outstandingly novel characteristics that distinguish the powder from all other silicas, silicates, aluminum hydrates or the like. In making this powder to be used advantageously in alkaline sized paper, the pH of the reaction medium should be maintained at or near about 8 to 10.5, preferably between 8.8 and 9.0; with the pH of the final product being at or near 9.5–10.5 upon completion of the reaction.

Upon completion of the reaction procedure, the precipitated pigment is separated from the reaction medium by filtration. It is then dried in any suitable manner, such as spray drying, to obtain a friable fine particulate powder.

The specific gravity of the low surface area silica pigments claimed herein is about 2.37 g./cc.

The following examples illustrate particularly advantageous embodiments of the invention. However, it should be expressly understood that the examples to follow are given as illustrations only and are not intended to limit the scope of the invention thereto.

EXAMPLE 1

A 6400 gallon reaction vessel was used with 2 sets of flat bladed turbines rotating at 100 r.p.m. and resting in horizontal positions on a "Lightnin' Mixer" which was supplied by Mixing Equipment Company. About 1,077 gallons of sodium sulfate liquor were used as the reaction medium containing 10–12% sodium sulfate by weight with the remaining weight as water. The reaction vessel was charged with the 1,077 gallons of sulfate liquor and heated at 140° F. The agitator was started. The sodium silicate solution was run directly into the vortex formed by the flat bladed turbines at about 28.2 g.p.m. Silicate concentration was 2.0 lbs./gallon. One minute after the silicate was started, the aluminum sulfate (alum) slurry was run into the reaction vessel at about 25 g.p.m. at a concentration of about 2.5 lbs./gallon. This rate was required to lower the reaction slurry pH to 9.0 in 5 minutes±1 minute. When the precipitating pH (pH of reaction slurry) reaches 9.0, the alum rate was lowered to 21 g.p.m. to maintain the 9.0 pH for the remainder of the reaction period. Addition of the silicate solution continued for about 39 minutes, at which time both the silicate flow and alum flow were stopped. The mass was then heated to 160° F. and digested for a minimum of 15 minutes. This allowed for more efficient filtration of the solution. It was then dropped to a filter feed tank and passed on to a heat exchanger to maintain the temperature at about 140° F. The resulting filter cake slurry was then pumped to the filter basin where the sulfate liquor was displaced with wash water on a rotary vacuum filter drum. The thixotropic filter cake, which had a wet cake solids content of about 35%, was then discharged into a screw conveyor, which took the material to a high shear slurry mill, from there to a spray dryer by a positive displacement pump and spray dried. The powdery material was finally milled through a Raymond vertical impact mill into a fine particulate powder.

The resulting material was a fine white powder with a mean particle size of about 70 millimicrons, low surface area of about 15 to 40 m.$^2$/g., a valley abrasion of 15, and specific gravity of 2.37. Chemical analysis of the product showed the following composition:

| | Percent |
|---|---|
| Loss on Ignition | 10.9 |
| $SiO_2$ | 68.4 |
| $Al_2O_3$ | 10.1 |
| $Na_2O$ | 4.0 |
| $Na_2SO_4$ | 4.1 |

EXAMPLE 2

The procedure for Example 1 was repeated with the exception that 1,077 gallons ±20 gallons of 11% ±.5% of sodium sulfate solution were used as the reaction medium and the reaction temperature was held at 140° F. ±3° F.

The resulting material was a fine white, powdery material with a mean particle size of about 70 millimicrons, low surface area of about 40–41 m.$^2$/g., and specific gravity of 2.22. Chemical analysis of the product showed the following composition:

| | Percent |
|---|---|
| Loss on Ignition | 11.2 |
| $SiO_2$ | 67.9 |
| $Al_2O_3$ | 10.4 |
| $Na_2O$ | 5.6 |
| $Na_2SO_4$ | 4.1 |

In attempting to determine the relationship between pigment properties and the critical properties of alkaline sized paper, one conventional approach used was the tedious preparation and analysis of handsheets made under a multitude of conditions. Handsheets were prepared on the Noble & Wood sheet machine at a nominal basis weight of 50 lb., 25" x 38"—500. After wet pressing, the sheets were removed from the forming wires before being dried. This was necessary because when an alkyl ketene dimer is dried on the forming wire, it becomes water repellent and sheets can no longer be properly formed.

The pulp that was used for the handsheet formation was a blend of equal amounts of bleached softwood and hardwood kraft supplied at about 12% consistency. It was beaten to about 320 ml. CS Freeness in a Valley beater before use. For evaluations at alkaline conditions, the stock was adjusted to pH 8.0–8.2 at the proportioner using sodium bicarbonate. When rosin sized sheets were prepared to be used as control sheets, alum was added to obtain pH 4.3–4.8 and 2% Pexol size was added. Pexol is a fortified rosin made by Hercules, Incorporated. Pigments were added at the proportioner and except where noted, retention aids were also added there.

One-pass handsheets were prepared when single or two pigment systems were made and evaluated. In all cases in which three pigment systems were used, which simulated commercial furnishes, white water was recirculated and the first five handsheets were discarded. Results from the next five sheets were averaged. In reporting handsheet data, unconventional units were used in some instances. Since two-digit whole numbers are easily compared, most data were put in this form.

Sizing is reported in seconds for 50% ink penetration of a one inch square of paper floated on Monsanto test ink (pH 1.5) at 100° F. Paper optical properties are reported as TAPPI brightness or TAPPI opacity. These properties are dependent on the amount of filler in the sheet and also in some measure on basis weight variations. Therefore, the optical efficiency of fillers and extenders or filler systems are expressed as pigment scattering coefficients. These have been calculated according to the conventional Kubelka-Munk equations using basis weight in grams per square meter. In order to obtain whole numbers, the results have been multiplied by 100. Strength data is reported as breaking length. This is normally reported in meters and usually is in the range of 3,000 to 10,000 meters. Since the last two digits are not significant, length will be shown in the range of 30 to 100 hecto meters. Typically, breaking lengths of 40–50 hecto meters were obtained. Retention is reported to the nearest percent. It is corrected for the ash of an unfilled sheet and for the loss on ignition of each of the pigments present. When more than one filler or extender pigment is present in a sheet, each will usually be and is normally assumed to be retained in the same ratio as added.

With conventional rosin—alum sized paper, the degree of sizing is roughly a linear function of the amount of size used. Alkyl ketene dimers, however, afford very little sizing until a threshold amount is retained. There is consequently a rather sharp increase in sizing with little additional size added. This effect is illustrated in Table 1.

TABLE 1

Sizing time of unfilled 50 pound handsheets

| Percent Alkyl Ketene Dimer (Dry Basis) of Fiber Weight | Sizing (Seconds) Time for 50% Ink Preparation |
|---|---|
| .05 | 0 |
| .10 | 360 |
| .15 | 5400 |
| .20 | 7200+ |

Since the amount of alkyl ketene dimer retained is critical, it is especially important to control all factors that would interfere with its effectiveness or its retention. Because of the sensitivity of sizing of alkyl ketene dimers to certain fillers, it is important to retain fillers at as high a level as possible. This would minimize the ratio of filler to alkyl ketene dimer at the headbox. The retention of alkyl ketene dimer in the sheet might concurrently increase. This would also help to improve the sizing of the paper.

A number of commercially available retention aids were evaluated for use in alkaline sized paper with alkyl ketene dimers and the aforementioned low surface area sodium alumino silicate pigment. The retention aids include most of the basic chemical types which are presently being used for alkaline sizing. An early screening evaluation of the retention aids, listed in Table 2, found that several are compatible with the above described low surface area sodium alumino silicate pigment. Of those evaluated, Lufax 295, a polypropylene amine produced by Rohm & Haas, was most efficient and subsequently chosen for additional work. In Table 2, all retention aids were evaluated in 50 pounds 25″ x 38″—500 handsheets at pH 8.2. The before-mentioned sodium alumino silicate was added in the amount of 8.5%.

TABLE 2.—RETENTION AID EVALUATION

| Retention aid | Percent Used | Sodium alumino silicate | Retention |
|---|---|---|---|
| No retention aid Hydraid 773 [1] | | 1.78 | 21.0 |
| | .05 | 4.83 | 57.0 |
| | .10 | 6.50 | 76.5 |
| | .20 | 6.55 | 77.0 |
| Hydraid 776 [2] | .05 | 5.10 | 60.0 |
| | .10 | 6.80 | 80.0 |
| | .20 | 6.75 | 79.0 |
| Lufax 295 [3] | .05 | 3.22 | 38.0 |
| | .10 | 4.80 | 56.5 |
| | .20 | 6.43 | 76.0 |
| Gendriv 162 [4] | .05 | 3.92 | 46.0 |
| | .10 | 5.07 | 59.5 |
| | .20 | 6.00 | 70.5 |

[1,2] An organic polymer from Calgon.
[3] A polypropylene amine from Rohm & Haas.
[4] A cationic guar derivative from General Mills.

As seen in Table 2, this later, more detailed study of retention aids and their effectiveness in relation to low surface area sodium alumino silicate pigment retention in a sheet of paper indicates that other retention aids are at least as effective as the already-described Lufax 295. Table 2 shows that Hydraid 773 and 776 and Gendriv 162 are also effective retention aids in an alkaline sized sheet.

Since it was believed that the order in which the low surface area sodium alumino silicate pigment, the alkyl ketene dimer, and the retention aid are added to the paper furnish might be important, six orders of addition were studied and evaluated. This evaluation indicated that there is no significant, clear-cut advantage of one order of addition over another. However, in handsheet preparation there is an absence of the high shear which is present in machine operation which might indicate that order of addition cannot be accurately evaluated using handsheet techniques. Work by others using a pilot fourdrinier indicated that the alkyl ketene dimer and the retention aid should be added as late as possible, however, while remaining consistent with good mixing procedures.

Titanium dioxide and several fine particle size materials were evaluated as single fillers in alkaline sized paper made at pH 8.2. Table 3 shows the materials and their degrees of effectiveness as noted by the sizing time which is measured by ink flotation time. A 1–2″ square sample was floated on ink and the time in seconds for 50% penetration of the ink was measured. Special Monsanto test ink at pH 1.5 was used at 100° F. Materials that provide good sizing are $TiO_2$, Hydral 710 (a hydrated alumina from Alcoa), and the aforementioned low surface area sodium alumino silicate.

TABLE 3.—$TiO_2$ AND FINE PARTICLE SIZE PIGMENTS

| Material | Percent Added | Percent Retained | Surface area, m.²/g. | Size | 100 SP* |
|---|---|---|---|---|---|
| $TiO_2$ | 3.7 | 61 | 8 | 1,800+ | 39 |
| Hydral 710 | 3.5 | 46 | 8 | 1,800+ | 22 |
| Hi Sil 404 [1] | 3.5 | 45 | 35 | 0 | 21 |
| Zeolex® 23P [2] | 3.8 | 23 | 68 | 0 | 14 |
| Low surface area sodium alumino silicate | 3.5 | 71 | 35 | 1,800+ | 20 |

[1] PPG Industries.
[2] J. M. Huber Corporation.
*Pigment scattering coefficient.

A number of modified sodium alumino silicates were evaluated in alkaline sized paper. The only modified sodium alumino silicate that showed good size tests was produced hydrothermally at high pressure and temperature to drastically reduce the surface area.

In handsheet work, which correlates as closely as possible to conditions actually found in a paper mill, three filler systems were used in the handsheets and white water was recirculated. The first five sheets were discarded and the average of the next five sheets was reported. This work confirmed much of the previous work that had been done. Most importantly, it indicated that a low surface area sodium alumino silicate performed quite well as a $TiO_2$ extender in alkaline sized paper. It also confirmed the importance of keeping pigment retention at a very high level. Finally, it also indicated that the addition of calcium carbonate, when substituted for clay in alkaline sized paper, will result in paper having optical properties as good as paper made from clay using conventional rosin-alum sizing.

The new, low surface area sodium alumino silicate pigments, produced according to this invention, are particularly useful, as before-mentioned, in alkaline sized paper as filler and extender pigments. They are also useful in fine paper furnishes, as well as in rosin-alum acid sized papers. They are also valuable pigments in various synthetic rubbers or elastomers, such as styrene-butadiene polymers and the like.

When this invention was compared to the existing sodium alumino silicate pigment which is the subject of U.S. Pat. No. 2,848,346, the following differences were observed:

(1) During the process of manufacture, the pH level of the silicate pigment of the present invention was maintained at 8.8–9.0 whereease the silicate pigment of 2,848,346 was kept at a pH of 10.4–10.9 during its formation;

(2) Reaction temperature of the silicate pigment of the present invention maintained at 60° C. ± 3° and the sodium sulfate concentration of the reaction medium was held at 11% ± $Na_2SO_4$.

The silicate pigment which was the subject of the prior patent was not produced at a constant temperature or sodium sulfate concentration.

(3) The process of the present invention calls for a definite excess silicate addition time and a definite time to bring the reaction slurry pH down to the precipitating pH which were not necessary in 2,848,346.

Differences in the properties of the new product and the old are also noted:

The advantages of the new product over the existing product are:

(1) Lower production costs because of the increased density of the new product;

(2) Because of lower volume per given weight a volumetric saving is accomplished in stacking, shipping and storing the new product;

(3) The new product is superior to the existing product in maintaining the sizing efficiency of alkaline paper without sacrificing optical properties.

(4) The new pigment has been found unexpectedly to be an outstanding extender pigment in acid (in alum-rosin) paper systems.

The results of comparison between the low surface area sodium alumino silicate and the existing products are given in the following table.

EFFECT OF SODIUM ALUMINO SILICATES IN ALKALINE PAPER

Furnish: 50:50 Hardwood Bleached Kraft: Softwood Bleached Kraft pH---------------- 8.2
Size-------------- 0.3% Aquapel
Retention air----- 0.1% Lufax 295
Basis weight------ 74 g./m.²

| Percent filler | TAPPI Brightness (Elrepho) | | | | TAPPI Opacity at 74 g./m.² BW | | | | Sizing time, sizing seconds | | | |
|---|---|---|---|---|---|---|---|---|---|---|---|---|
| | 0 | 2 | 4 | 6 | 0 | 2 | 4 | 6 | 0 | 2 | 4 | 6 |
| Unfilled | 84.1 | | | | 81.2 | | | | 600+ | | | |
| Regular sodium alumino silicate | | 84.7 | 85.7 | 86.2 | | 83.2 | 84.3 | 85.0 | | 140 | 15 | 0 |
| Low surface area sodium alumino silicate | | 84.5 | 85.6 | 86.1 | | 83.3 | 84.4 | 85.1 | | 600+ | 600+ | 600+ |

Although a specific preferred embodiment of the present invention has been described in the detailed description above, the description is not intended to limit the invention to the particular forms or embodiments disclosed therein, since they are to be recognized as illustrative rather than restrictive and it will be obvious to those skilled in the art that the invention is not so limited. The invention is declared to cover all changes and modifications of the specific examples of the invention herein disclosed for purposes of illustration, which do not constitute departures from the spirit and scope of the invention.

What is claimed is:

1. In a process for producing finely divided precipitated sodium alumino silicate pigments wherein aqueous solutions of sodium silicate and aluminum sulfate are introduced into an aqueous sulfate liquor reaction medium with the resulting precipitate being separated from the reaction medium, dried and recovered, the improvement comprising providing an aqueous sulfate liquor reaction medium containing from about 10 to 12% by weight of sodium sulfate with the remaining weight being essentially water; heating said sulfate liquor reaction medium to 140° F.; adding an aqueous sodium silicate solution and an aquetous solution of aluminum sulfate to said sulfate liquor reaction medium over a period of approximately 40 minutes while maintaining the pH of said reaction constant and within the range of from 8.8 to 9.0; heating the resulting reaction mass to approximately 160° F. and thereafter digesting said mass for a minimum of 15 minutes to thereby produce finely divided precipitated sodium alumino silicate pigments having a surface area in the range of from about 15 to 40 m.²/g., a mean particle

| | Specific gravity, g./cc. | Surface area, m.²/g. | Oil absorption, cc./100 g. | GE brightness | Particle diameter, nm. | Packing density, g./cc. |
|---|---|---|---|---|---|---|
| Low surface area sodium alumino silicate | 2.37 | 35 | 60–80 | 92 | 72 | .55 |
| Existing sodium alumino silicate | 2.10 | 72 | 105–125 | 92 | 40 | .32 | size of about 70 millimicrons, a specific gravity of about 2.37 and an oil absorption of about 65, said pigments being further characterized as having particular use as an extended and functional filler pigment in alkyl ketene dimer and other alkaline sized papers and giving increased sizing and opacity to same.

References Cited
UNITED STATES PATENTS

| | | | |
|---|---|---|---|
| 3,228,784 | 1/1966 | Mays et al. | 106—288 B |
| 3,582,379 | 6/1971 | Hackbarth et al. | 106—288 B |

FOREIGN PATENTS

| | | |
|---|---|---|
| 555,987 | 4/1958 | Canada. |

DELBERT E. GANTZ, Primary Examiner

S. BERGER, Assistant Examiner

U.S. Cl. X.R.

162—181